(12) United States Patent
Taylor

(10) Patent No.: US 9,914,464 B1
(45) Date of Patent: Mar. 13, 2018

(54) RAILROAD HOPPER CAR WITH BOTTOM DISCHARGE DOORS HAVING ANGLED SEALS AND ACTUATING ASSEMBLIES

(71) Applicant: Vertex Railcar Corporation, Wilmington, NC (US)

(72) Inventor: Fred Joseph Taylor, Independence, KY (US)

(73) Assignee: Vertex Railcar Corporation, Wilmington, NC (US)

( * ) Notice: Subject to any disclaimer, the term of this patent is extended or adjusted under 35 U.S.C. 154(b) by 0 days.

(21) Appl. No.: 15/807,090

(22) Filed: Nov. 8, 2017

(51) Int. Cl.
    *B61D 7/22* (2006.01)
    *B61D 7/18* (2006.01)
    *B61D 7/24* (2006.01)
    *B60L 5/39* (2006.01)
    *B61D 7/32* (2006.01)

(52) U.S. Cl.
    CPC .................. *B61D 7/24* (2013.01); *B60L 5/39* (2013.01); *B61D 7/22* (2013.01); *B61D 7/32* (2013.01); *B60L 2200/26* (2013.01)

(58) Field of Classification Search
    CPC ... B61D 7/22; B61D 7/18; B61D 7/26; B61D 7/28; B61D 7/02; B61D 7/16; B61D 7/24; B61D 7/32; B60L 5/39
    See application file for complete search history.

(56) References Cited

U.S. PATENT DOCUMENTS

| | | | | |
|---|---|---|---|---|
| 3,169,491 A | * | 2/1965 | Darlington | B61D 7/28 105/240 |
| 3,596,609 A | * | 8/1971 | Ortner | B61D 7/26 105/240 |
| 3,807,318 A | | 4/1974 | Chierici | |
| 3,878,794 A | * | 4/1975 | Adler | B61D 7/22 105/250 |
| 4,112,852 A | | 12/1978 | Koranda | |
| 4,207,020 A | * | 6/1980 | Schuller | B61D 7/18 105/241.2 |
| 4,222,333 A | | 9/1980 | Schuller | |
| 4,222,334 A | * | 9/1980 | Peterson | B61D 7/24 105/250 |
| 4,339,222 A | * | 7/1982 | Knippel | B61D 7/30 105/241.1 |
| 4,366,757 A | * | 1/1983 | Funk | B61D 7/26 105/248 |
| 5,005,490 A | | 4/1991 | Overheidt | |

(Continued)

*Primary Examiner* — Mark T Le
(74) *Attorney, Agent, or Firm* — American Patent Agency PC; Daniar Hussain; Xiaomeng Shi

(57) ABSTRACT

Methods and systems are provided for a railroad hopper car bottom discharge door having two door plates, where at least one is rotatable between open and closed positions for the bottom discharge door. A seal member is fixedly connected to a distal end of each door plate, respectively, and each seal member has a seal lip protruding from the corresponding door plate. One seal lip comprises a first obtuse angle on a lower surface of the seal lip, while the other seal lip comprises a second angle smaller than the first obtuse angle on an upper surface of the seal lip. When the bottom discharge door is closed, the two angles on the two seal lips interlock to form a seal. Methods and systems for a door-actuating assembly that utilizes a pick-up shoe and a rechargeable battery to minimize the occurrence of rail sparks inside dump sites are also provided.

20 Claims, 16 Drawing Sheets

(56) References Cited

U.S. PATENT DOCUMENTS

| | | | |
|---|---|---|---|
| 5,975,533 | A | 11/1999 | Hubbard |
| 6,227,124 | B1 | 5/2001 | Gaydos et al. |
| 7,703,397 | B2 | 4/2010 | Forbes |
| 7,735,426 | B2 | 6/2010 | Creighton et al. |
| 8,950,340 | B2 | 2/2015 | Wang et al. |
| 9,061,688 | B2 | 6/2015 | Yue et al. |
| 9,789,882 | B2 * | 10/2017 | Dalske .................... B61D 7/22 |
| 2006/0065501 | A1 | 3/2006 | Taylor |

* cited by examiner

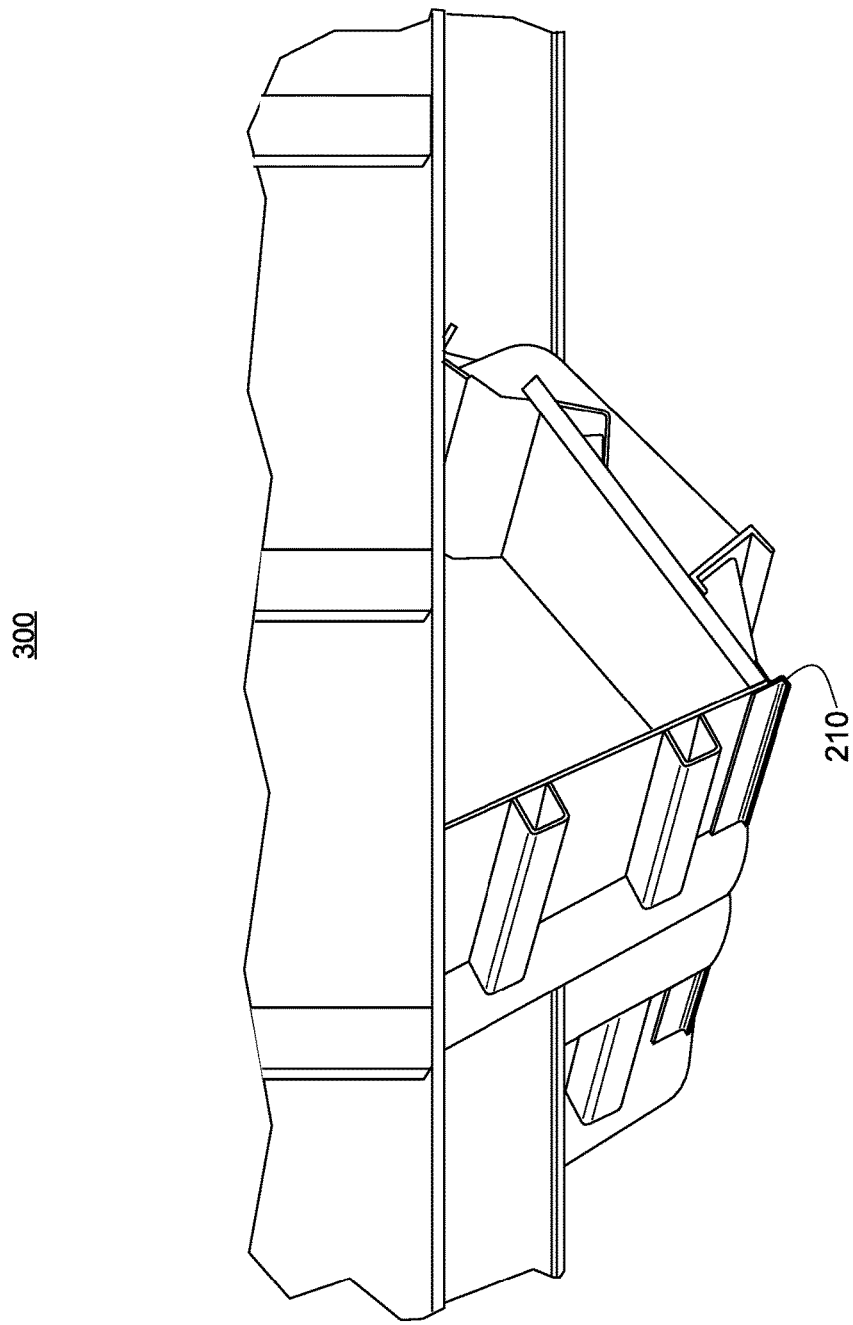

RAILROAD HOPPER CAR WITH BOTTOM DISCHARGE DOORS HAVING ANGLED SEALS AND ACTUATING ASSEMBLIES

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the U.S. Patent and Trademark Office files or records, but otherwise reserves all copyright and trade dress rights whatsoever.

FIELD OF THE INVENTION

Embodiments of the present invention are in the field of manufacturing technology of railroad freight cars, and in particular, to bottom discharge door devices and actuating systems, and a hopper car having the same.

BACKGROUND OF THE INVENTION

The statements in the background of the invention are provided to assist with understanding the invention and its applications and uses, and may not constitute prior art.

A hopper car is a type of railroad freight car used to haul bulk commodities such as coals, fertilizers, grains, and iron ores. A hopper car may be covered or open on top, and discharges its load through doors located on the underside of the car body. Automatic unloading of materials from a hopper car may be facilitated at designated dumping sites, where an electric current collector shoe or pickup shoe may slide over an energized trackside conductor rail to operate an electro-pneumatic control valve to open and close discharge doors.

One issue in hopper car design is in the sealing mechanism of bottom discharge doors. As bulk commodities are generally pelletized, granular, or particulate, poor sealing performance of a discharge door device may cause material leakage onto rail tracks, resulting in economic loss, adverse effects to drainage of the track bed, and possible environmental pollutions. Such effects are especially severe when materials are transported over long distances under various weather conditions.

Another issue in hopper car design is safety considerations for operations in confined dumping spaces such as buildings, unloading sheds, and grain elevators. Conventional bottom discharge hopper cars use pick-up shoes that slide across an electrified conductor rail to transmit electrical signals to the control valve, for automatically opening and closing one or more bottom discharge doors. When a tight, direct contact between a pick-up shoe and the conductor rail is lost, for example due to dirt or leaves on the rail, an electric arc may jump across the gap, creating sparks that can in turn ignite a fire or explosion within a confined space if dusts or similar combustible particulate materials are present in high-enough concentrations. As a result, unloading of hopper cars often occur in vented open spaces outside of processing and storage facilities.

Therefore, in view of the aforementioned difficulties, it would be an advancement in the state of the art to provide railroad hopper car designs with durable and long-lasting discharge doors and/or pick-up shoe arrangements and actuating assemblies that mitigate or prevent hazardous dust explosions.

It is against this background that the present invention was developed.

BRIEF SUMMARY OF THE INVENTION

The inventors of the present invention have created methods and systems for a bottom discharge door, comprising a first door plate, a second door plate, a first seal member, and a second seal member. The first door plate comprises a first hinged end and a first distal end opposite to the first hinged end; the second door plate comprises a second hinged end and a second distal end opposite to the second hinged end. The first seal member comprises a first attachment portion and a first seal lip; the second seal member comprises a second attachment portion and a second seal lip. The first seal member is fixedly connected to the first distal end at the first attachment portion, the first seal lip protrudes from the first distal end, and the first seal lip comprises a first obtuse angle on a lower surface of the first seal lip. The second seal member is fixedly connected to the second distal end at the attachment portion, the second seal lip protrudes from the second distal end, and the second seal lip comprises a second angle smaller than the first angle, on an upper surface of the second seal lip. At least one of the first and second door plates is rotatable around its hinged end, between a closed position and an open position for the bottom discharge door, and when the bottom discharge door is in the closed position, the first obtuse angle interlocks with the second angle to form a seal.

In some embodiments of the present invention, the first obtuse angle is measured between 93 degrees inclusive and 95 degrees inclusive. In some embodiments, the second angle is a right angle.

In some embodiments, the first attachment portion is a flat plate, the first attachment portion and the first seal lip form a third obtuse angle on a lower surface of the first seal member, and the third angle is measured between 145 degrees inclusive and 150 degrees inclusive. In some embodiments, the second attachment portion is a flat plate, and the second attachment portion and the second seal lip form a right angle on a lower surface of the second seal member.

In some embodiments, the first seal member is fixedly connected the first distal end at the first attachment portion through welding, bolting, or clamping, and the second seal member is fixedly connected to the second distal end at the second attachment portion through welding, bolting, or clamping.

In some embodiments, each of the first and second seal lips comprises elastically deflects when the bottom discharge door is in the closed position.

In some embodiments, each arm of each of the first obtuse angle and the second angle measures at least 2 inches in length.

In another aspect, the present invention is a railroad hopper car with bottom discharge doors having angled seals, comprising a body, a plurality of hoppers along an underside of the body, and a plurality of bottom discharge doors as disclosed above, situated on the underside of body for opening and closing the plurality of hoppers.

In some embodiments, the railroad hopper car further comprises a door-actuating assembly for actuating the bottom discharge doors. The door-actuating assembly comprises a pick-up shoe, a battery, a hermetically seal switch, and an electro-pneumatic valve electrically connected in series. The battery is rechargeable via the pick-up shoe when the pick-up shoe is biased into an active position having physical contact with a wayside conductor rail. The hermitically sealed switch is electrically connected to the battery at a first terminal, and electrically connected to an electro-pneumatic valve at a second terminal. The electro-pneumatic valve actuates the bottom discharge door device between the open position and the closed position, after the battery is charged beyond a pre-determined state of charge, and after the pick-up shoe is biased into an inactive position not having physical contact with the wayside conductor rail.

In yet another aspect, the present invention is a method for actuating a railroad hopper car bottom discharge door, comprising the steps of turning off a hermetically sealed switch electrically connected between a rechargeable battery and an electro-pneumatic valve; biasing a pick-up shoe into an active position having physical contact with a wayside conductor rail to charge the rechargeable battery, wherein the rechargeable battery is electrically connected to the pick-up shoe, and wherein the rechargeable battery is electrically insulated from the electro-pneumatic valve, determining whether the battery is charged beyond a pre-determined state of charge; and in response to determining that the battery is charged beyond a pre-determined state of charge, biasing the pick-up shoe into an inactive position not having physical contact with the wayside conductor rail, and turning on the hermetically sealed switch to activate the electro-pneumatic valve, to actuate the bottom discharge door device between an open position and a closed position.

In some embodiments, the battery is a capacitor. In some embodiments, the electro-pneumatic valve operates between 24 VDC and −24 VDC.

In some embodiments, the pick-up shoe is spring-biased. In some embodiments, the pick-up shoe further comprises a base plate adapted to be attached to the railroad hopper car, an electrical contact attached to the base plate, and a counterweight for biasing the pick-up shoe into physical contact with the wayside conductor rail.

Yet other aspects of the present invention include the structures, processes and methods comprising the steps described herein, and also include the processes and modes of operation of the systems and devices described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings. In these drawings, each identical or nearly identical component that is illustrated in various figures is represented by a like reference character. For purposes of clarity, not every component is labeled in every drawing. The drawings are not necessarily drawn to scale, with emphasis instead being placed on illustrating various aspects of the techniques and devices described herein.

FIG. 3A is a perspective view of a transverse bottom discharge door in a closed position, according to one embodiment of the present invention.

DETAILED DESCRIPTION OF THE INVENTION

Overview

Figure 1A:
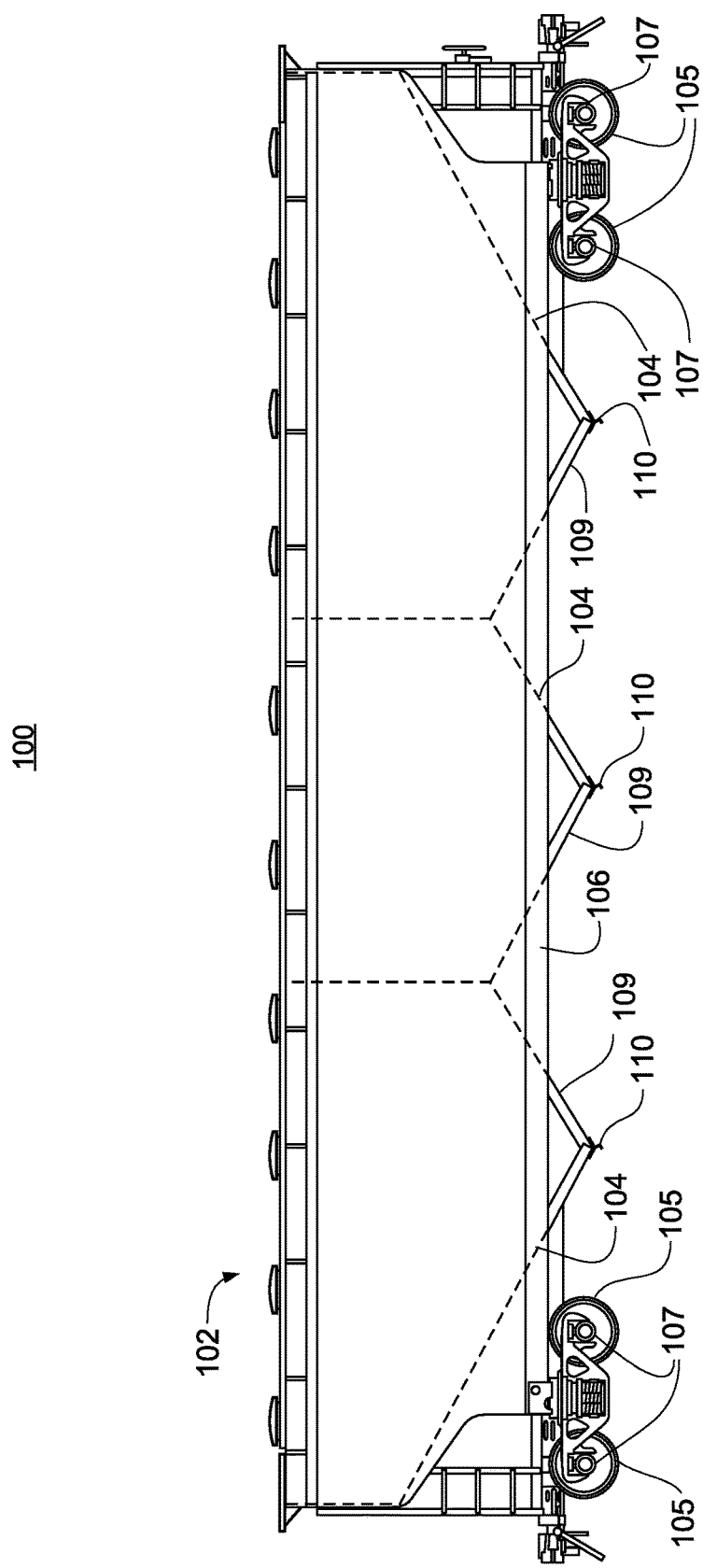
FIG. 1A is an elevation view of a three-pocket railroad hopper car having a transverse door associated with each hopper, according to one embodiment of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention. Furthermore, in the descriptions and in the claims which follow, the use of such words as "left", "right", "clockwise", "counterclockwise", "distal", "proximal", "forward", "outward", "rearward", "vertical", "horizontal", and the like is in conjunction with the drawings for purposes of clarity.

Broadly, embodiments of the present invention relate to railroad hopper car design. More specifically, embodiments of the present invention are directed to bottom discharge doors having angled seal lips that engage and interlock tightly and securely to prevent leakage of commodity materials. An angled door seal utilizes a unique structure to achieve high and long-lasting sealing performances, while also reducing the dependence on elastic materials such as rubber, which often deteriorate under use and over time.

Embodiments of the present invention are further directed to mechanisms and device assemblies for actuating bottom discharge doors while eliminating sparking that may cause dust explosions in confined spaces. Conventionally, automatic bottom discharge hopper cars use pick-up shoes that rub or slide against an electrified "hot" rail at dumping sites to generate and transmit electrical signals to an electro-pneumatic control valve to open or close discharge doors. Any minor discontinuation in the physical contact between a pick-up shoe and a hot rail may create a spark. Described herein are door-actuating assemblies that utilize a rechargeable battery to eliminate the potential presence of sparks. The rechargeable battery is charged via the pick-up shoe prior to the hopper car entering a loading site, when a hermetically sealed switch is turned off to insulate the battery from the control valve. The pick-up shoe is then de-activated with a biasing mechanism. Inside the loading site, the hermetically sealed switch may be turned on to allow the battery to discharge and activate the control valve, enabling automatic discharge without sparking hazards. An additional benefit of the actuating assembly as disclosed herein is that when the hermetically sealed switch is left on, the hopper car may function as a conventional, fully automatic, dump-in-motion car, thus enabling existing automatic bottom discharge hopper cars to be upgraded without mandatory changes to dump site rail layouts.

With reference to the definitions above and the figures provided, embodiments of the present invention are now described in detail.

Discharge Door Seal

Figure 1B:
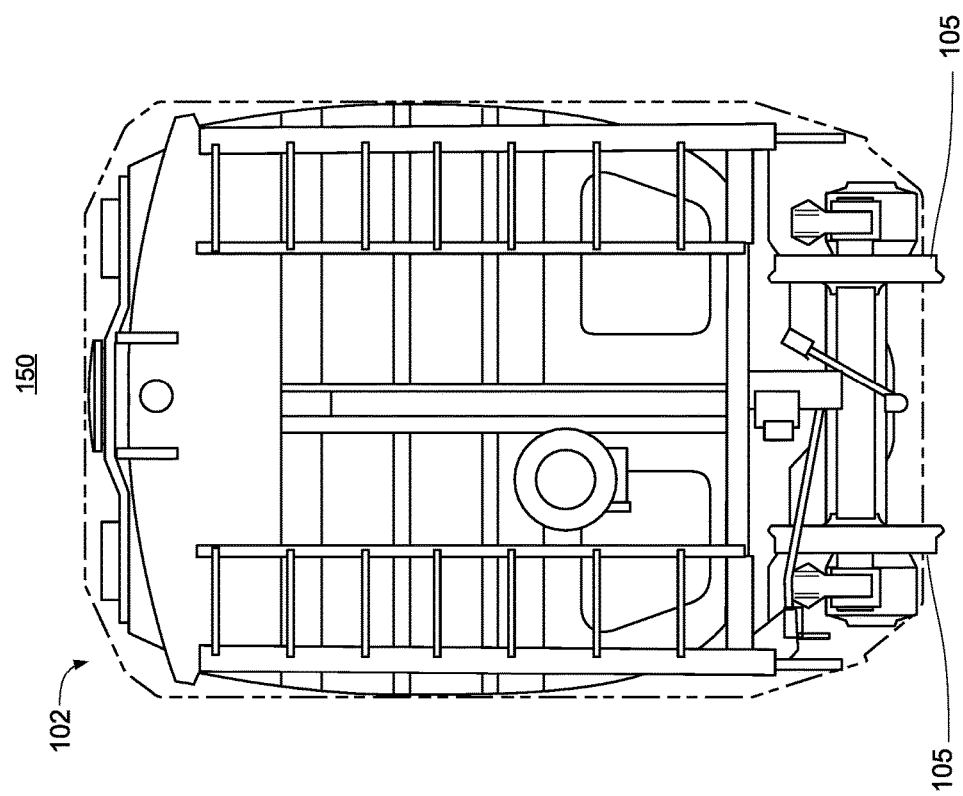
FIG. 1B is a transverse view of the three-pocket hopper car shown in FIG. 1A.

FIG. 1A is an elevation view 100 of a three-pocket railroad hopper car 102 having transverse bottom discharge doors with angled seals, according to one embodiment of the present invention. Correspondingly, FIG. 1B shows a transverse view 150 of the three-pocket hopper car 102. Car 102 may be provided with a plurality of hopper units 104, a plurality of wheels 105 mounted on a series of truck axles 107, and a longitudinally extending center sill 106. Each hopper unit 104 may be provided with a bottom discharge door device 109 which is moveable to open and close each hopper unit 104. For example, one or more door plates of door 109 may be rotatable between a closed position and an open position. An actuating system for this type of bottom discharge hopper car may be mounted to car 102 on the underside of sill 106 to provide power. The operation of air cylinders is well known in the art, and it is within the scope of the present invention to use any suitable power source such as an electric one to operate such cylinders. One exemplary actuating system is taught in U.S. Pat. No. 7,080,599, issued on Jul. 25, 2006, which is incorporated by reference in its entirely herein.

To improve the sealing effect of bottom discharge door device 109, members of angled door seals 110 are attached to individual door plates respectively. Although bottom discharge door device 109 is shown as transverse in FIG. 1, an angled door seal as disclosed herein may be utilized with longitudinal bottom discharge door devices as well, mounted on railcars, trailers, or any other vehicle with discharge compartments, including tractors. In addition, Although the system as disclosed below teaches the operation of a single door device having a single pair of door plates, the actuating mechanism as disclosed herein may also be used to open multiple sets of transverse or longitudinal door devices.

Figure 2A:
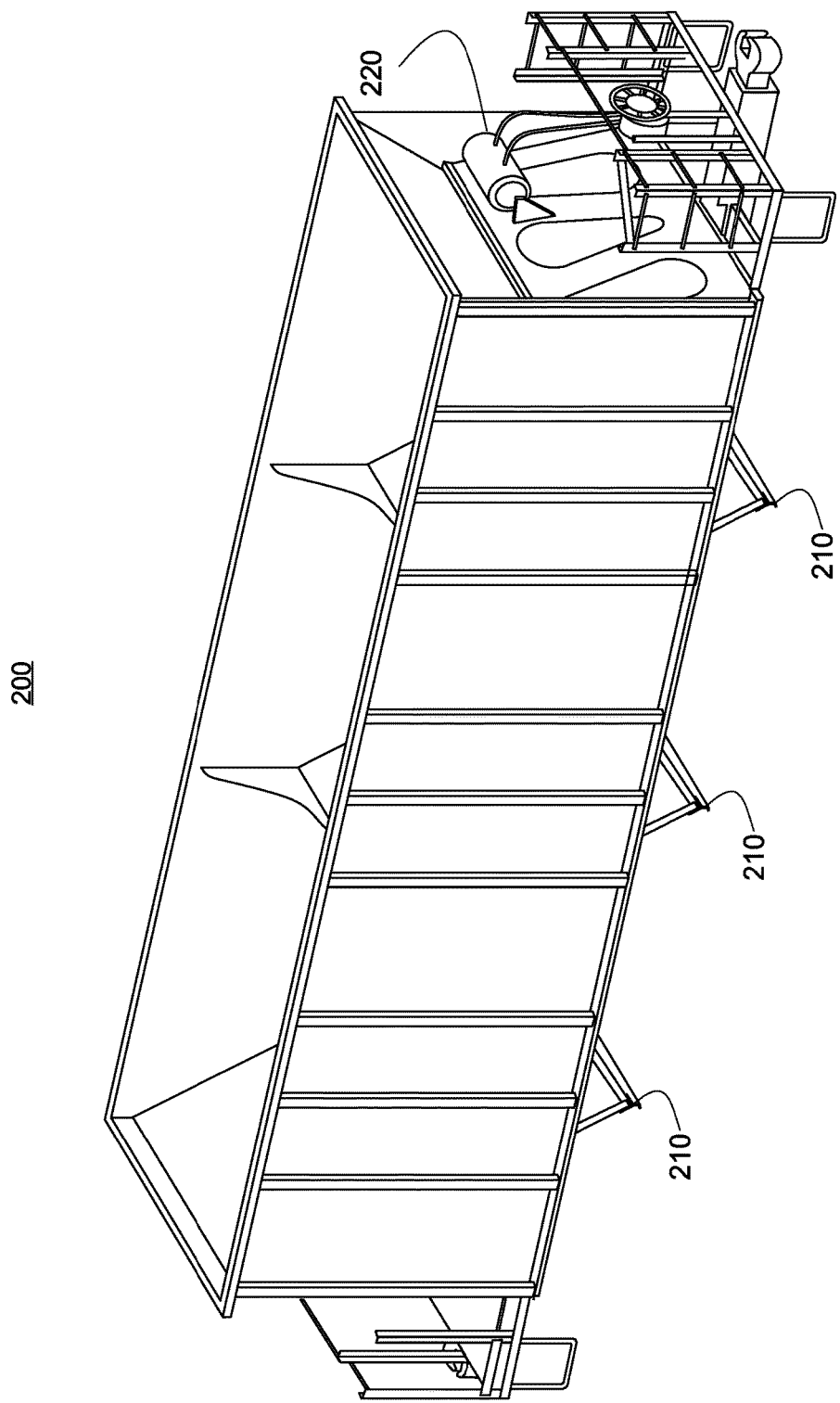
FIG. 2A shows a perspective view of a body of a three-pocket railroad hopper car, according to one embodiment of the present invention.

FIG. 2A shows a perspective view 200 of a body of a three-pocket railroad hopper car, according to one embodiment of the present invention. In this embodiment, angled doors seals 210 are shown explicitly for illustration purposes only, not necessarily to scale. In this embodiment, air cylinder 220 is attached to an end of the car body instead of to a bottom center sill.

Figure 2B:
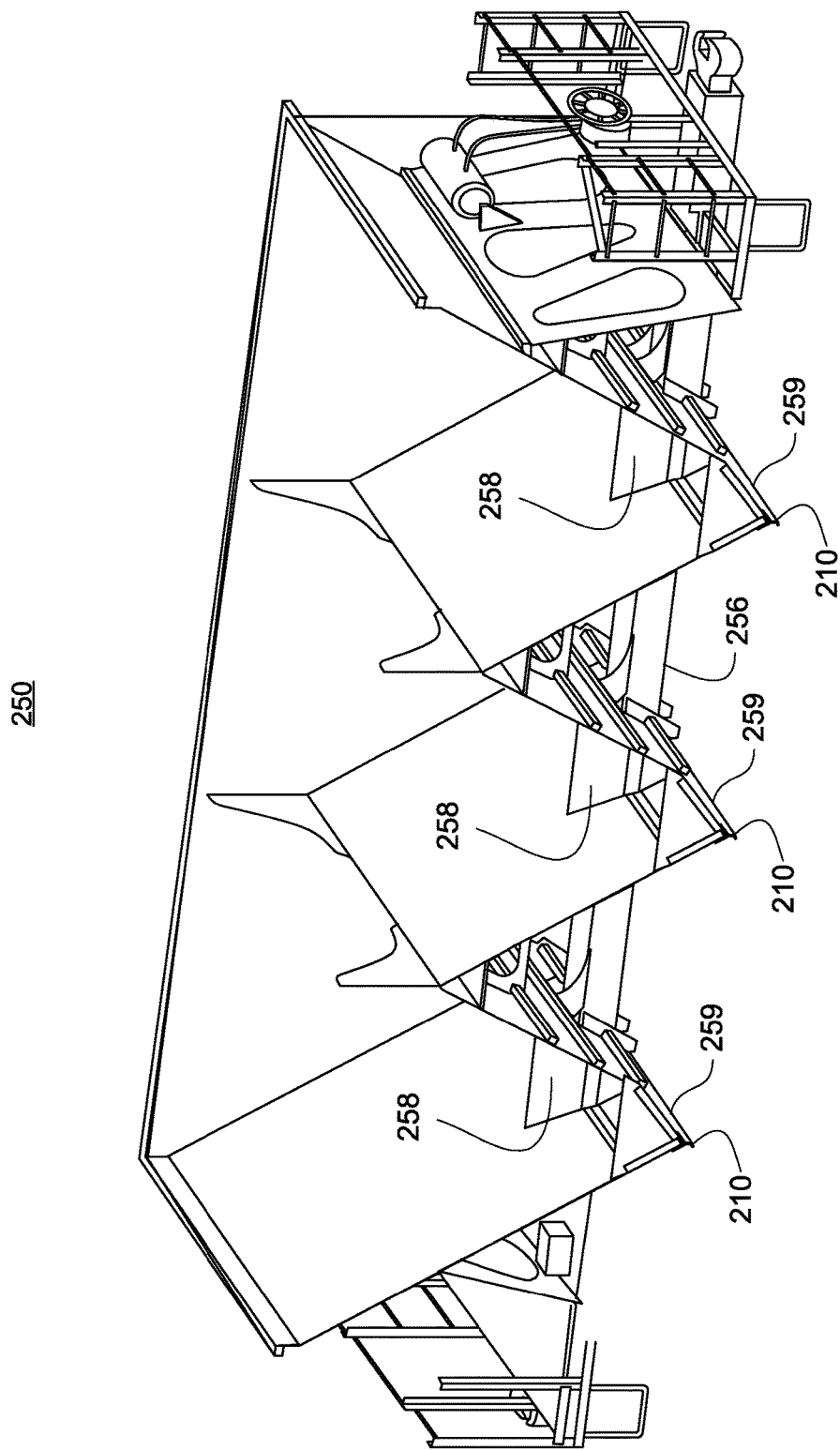
FIG. 2B is a longitudinal section view of the hopper car body shown in FIG. 2A.

FIG. 2B shows a longitudinal section view 250 of the hopper car body shown in FIG. 2A, with the near side beam removed to reveal internal details. In this embodiment, rather than having full-width hopper discharge doors, there are two half-width discharge doors mounted on either side of center sill 256, which itself is protected from abrasion or other damages by shrouds 258. Directly visible in FIG. 2B is bottom discharge door 259, with angled seal 210. In different embodiments, each pair of bottom discharge doors separated by the center sill may be actuated jointly using the same door-actuating assembly.

Figure 3B:
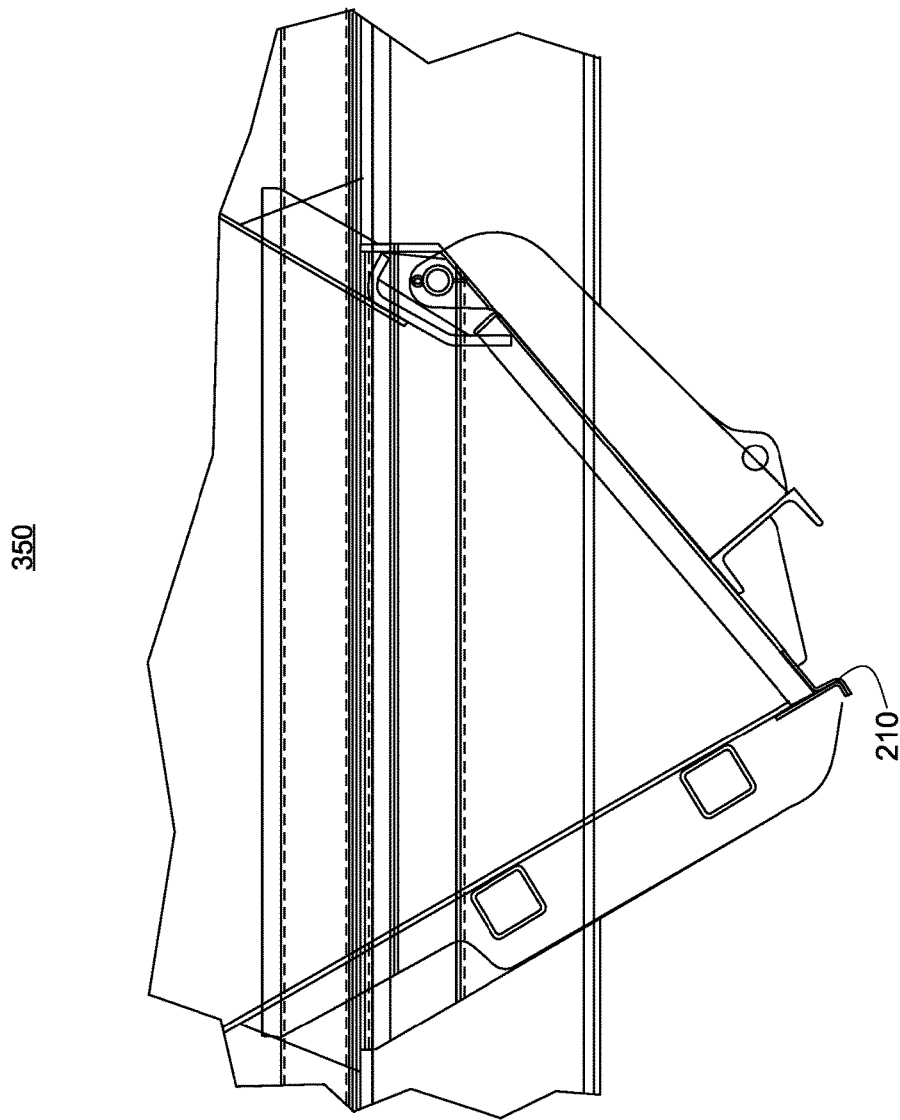
FIG. 3B is an elevation view of the transverse bottom discharge door shown in FIG. 3A.

FIG. 3A is a perspective view 300 of a transverse bottom discharge door device with an angled seal 210, in a closed position, according to one embodiment of the present invention. FIG. 3B is a corresponding cross section view 350. In FIG. 3A, a side panel of the door is removed to show internal details.

Figure 4:
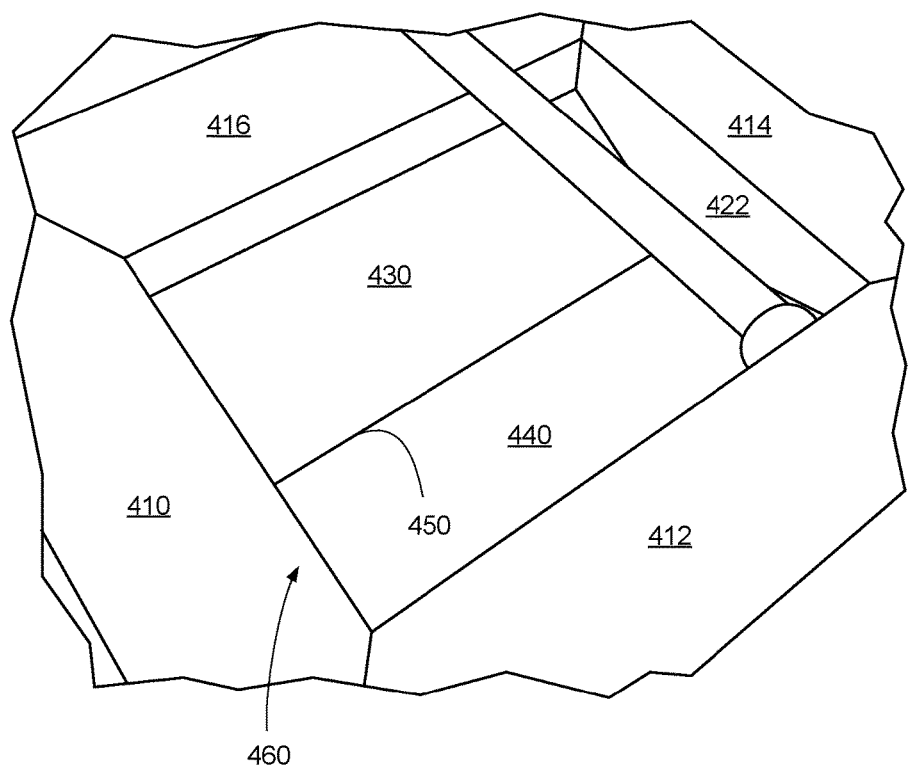
FIG. 4 is a top perspective view of a bottom discharge door in a closed position, according to one embodiment of the invention.

FIG. 4 is a top perspective view 400 of a bottom discharge door device 460 in a closed position, according to one embodiment of the invention. Door 460 comprises two door plates 430 and 440, one or both of which may be hinged at its outer edge, and rotatable between an open position and a close position. Thus, both door plates may be movable, or one may be stationary while the other one is movable. When door 460 is in the closed position as shown in FIG. 4, door plates 430 and 440 come together at edge 450. Similar to doors shown in FIG. 3A, door plates 430 and 440 are slanted when closed, and one or more side panels 422 may be fixed in place to close off the door device. In some embodiments where door 460 is full-width, components 410, 412, 414, and 416 may represent the four sidewalls of a hopper respectively. In some embodiments where door 460 is only half-width, similar to that shown in FIGS. 2A to 3B, components 410, 412, 414, and 416 may represent sidewalls of a hopper as well as a center sill-protecting shroud. For example, side component 422 may correspond to shroud 258 shown in FIG. 2B.

Figure 5A:
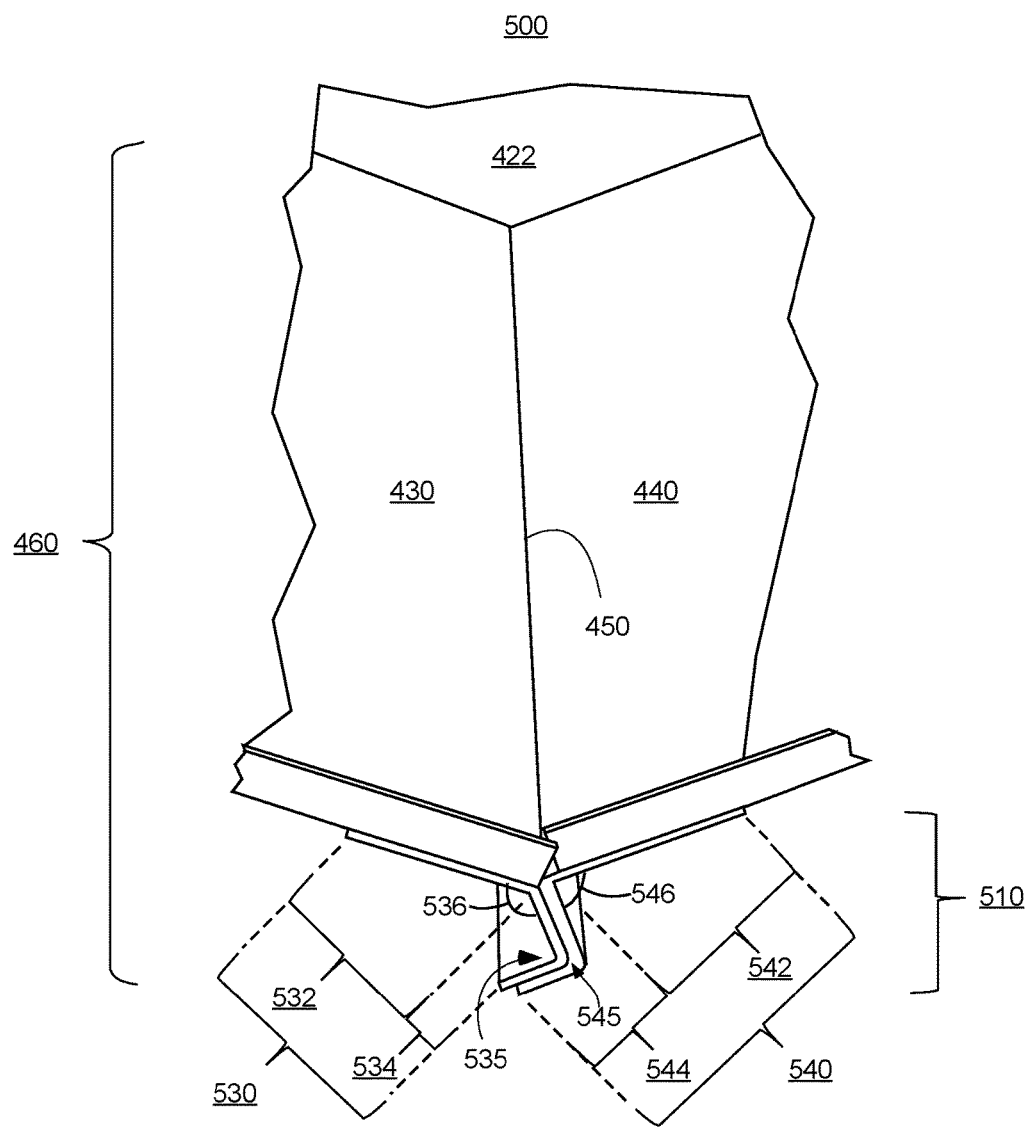
FIG. 5A is a side perspective view of a bottom discharge door in a closed position, according to one embodiment of the invention.
Figure 5B:
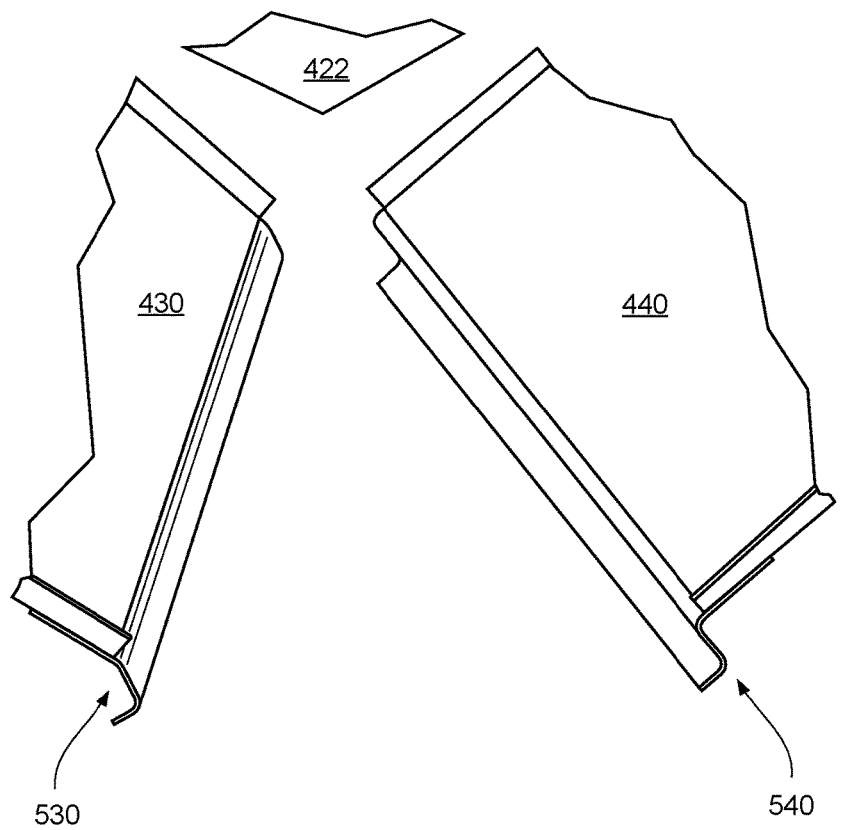
FIG. 5B is a side perspective view of a bottom discharge door in an open position, according to one embodiment of the invention.

FIG. 5A is a side perspective view 500 of the bottom discharge door 460 in a closed position, according to one embodiment of the invention. FIG. 5B is a side perspective view 550 of the bottom discharge door 460 in an open position. An angled seal 510 is formed by interlocking seal members 530 and 540 when door 460 is in the closed position. First seal member 530 is fixedly connected or mounted to door plate 530 through attachment portion 532, with seal lip 534 protruding from a distal edge of door plate 430, shown as edge 450 in FIG. 5A. Similarly, a second seal member 540 is fixedly connected or mounted to door plate 440 through attachment portion 542, with seal lip 544 protruding from a distal edge of door plate 440, shown as edge 450. Both seal members may be made of metals or alloys such as steel, and the fixed connections may be made by welding, bolting, clamping, or any other appropriate attachment means. In some embodiments, attachment portions 532 and 542 may be absent, where the seal lips 534 and 544 may be attached to the distal edge of the door plates directly. In either case, seal 510 may be added to conventional bottom discharge doors as upgrades to improve their general sealing performances.

In this embodiment, a bent is made to seal lip 534 to form an obtuse angle 535 on the lower surface of seal lip 534, and another bent is made to seal lip 544 to form another angle 545 slightly smaller than angle 535, on the upper surface of seal lip 545. As shown in FIG. 5A, the two angles interlock to form seal 510 when door 460 is in the closed position. At the coming together of the door plates, engagements of seal lips 534 and 544 may cause a flexing or elastic deflection of each seal lip, as the "female" angle 545 is slightly smaller than the "male" angle 535. A tight and secure seal 510 is therefore formed to prevent leakage of commodity materials from the hoppers.

Furthermore, in this embodiment, a downward bent may be made to form an angle 536 between attachment portion 532 and seal lip 534 on the left, while a similar bent may be made to form angle 546 between attachment portion 542 and seal lip 544. These angles are formed to serve at least two purposes. First, they conform to the degree to which door plates 430 and 440 are slanted. Second, they ensure that the door plates may be closed in any order, even though protruding, overlapping seal lips are present. In some embodiments, angle 536 may be between 140 and 150 degrees. In some embodiments, angle 536 may be 180 degrees while 546 may be made smaller in accommodation.

Figure 6A:
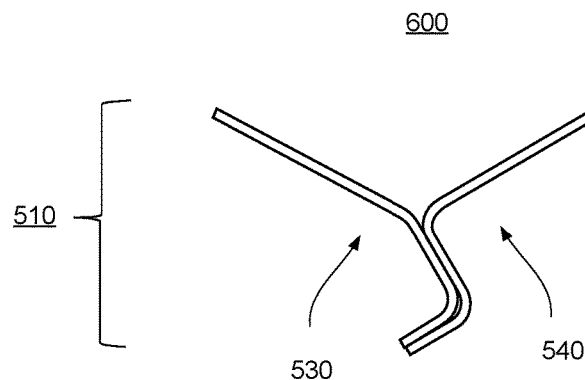
FIG. 6A is an elevation view of a bottom discharge door seal shown in FIG. 5A.
Figure 6B:
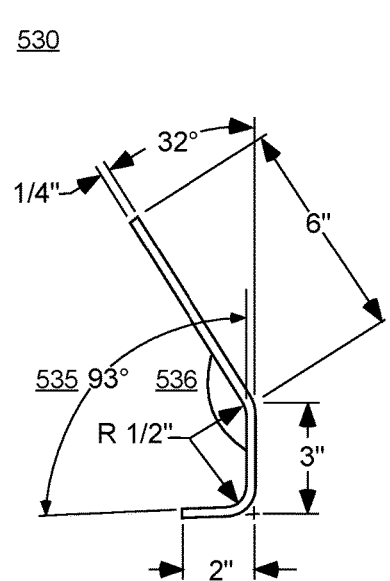
FIG. 6B is an elevation view of a first seal member of the bottom discharge door seal shown in FIG. 6A.
Figure 6C:
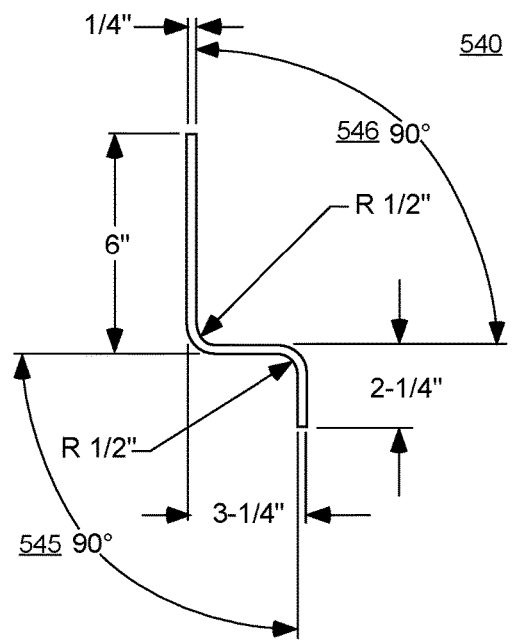
FIG. 6C is an elevation view of a second seal member of the bottom discharge door seal shown in FIG. 6A.

FIG. 6A is a zoomed-in elevation view 600 of the bottom discharge door seal 510 shown in FIG. 5A. Correspondingly, FIGS. 6B and 6C shown respective elevation views of each seal member 530 and 540 of the bottom discharge door seal shown in FIG. 6A. More specifically, FIGS. 6B and 6C show exemplary dimensions and angles of each seal member, according to one embodiment of the present invention. For example, obtuse angle 535 is shown as 93° in FIG. 6A, angle 536 is set to 148°, and both angles 545 and 546 are right angles at 90°. In various embodiments, obtuse angle 535 may take on values within different intervals, for example, between 93 degrees inclusive and 95 degrees inclusive, between 90 degrees and 93 degrees, between 90 degrees and 95 degrees, and between 93 degrees and 100 degrees. Each interval may include or exclude one or both boundary values. Similarly, angle 536 may be between 130 and 145 degrees, 140 and 150 degrees, 150 and 165 degrees, or 165 and 180 degrees. The lengths of each arm of angles 535, 536, 545, and 546 are measured in terms of inches in FIGS. 6B and 6C. In addition, the radius of curvature for angles 535, 545, and 546 are set at 0.5 inch, respectively, in this embodiment of the invention. Having a non-zero curvature may enable an easier manufacturing process. In other embodiments of the present invention, the radius of curvature for each angle shown may take on different values within the range between 0 inclusive and 5 inches inclusive.

Pick-Up Shoe

Conventional bottom discharge hopper cars are typically operated via an electro-pneumatic valve, where an electrical signal activates a control valve such as a directional solenoid valve, to allow pneumatic actuation of the doors. Generally, solenoid valve activation is initiated by the electrical signal, but the actual movement of the valve elements is achieved using air pressure. The electrical control signal is collected using a pick-up shoe from a wayside conductor rail, and transmitted to the control valve. In some systems, when a positive direct-current voltage such as 24 VDC is present on the conductor rail and the pick-up shoe, while a negative direct current voltage such as −24 VDC is present on a corresponding ground connection such as a regular rail, a signal may be sent through an "open" solenoid to actuate an air cylinder such as 220 to open the bottom discharge doors. When the voltages are reversed, a signal may be sent through a "close" solenoid to close the doors. When the pick-up shoe is in the active position, rubbing against the conductor rail, sparks may be created. Embodiments of the present invention improves on the conventional design to eliminate the sparking issue by separating the electrical signal collection process and the door-actuating process.

Figure 7:
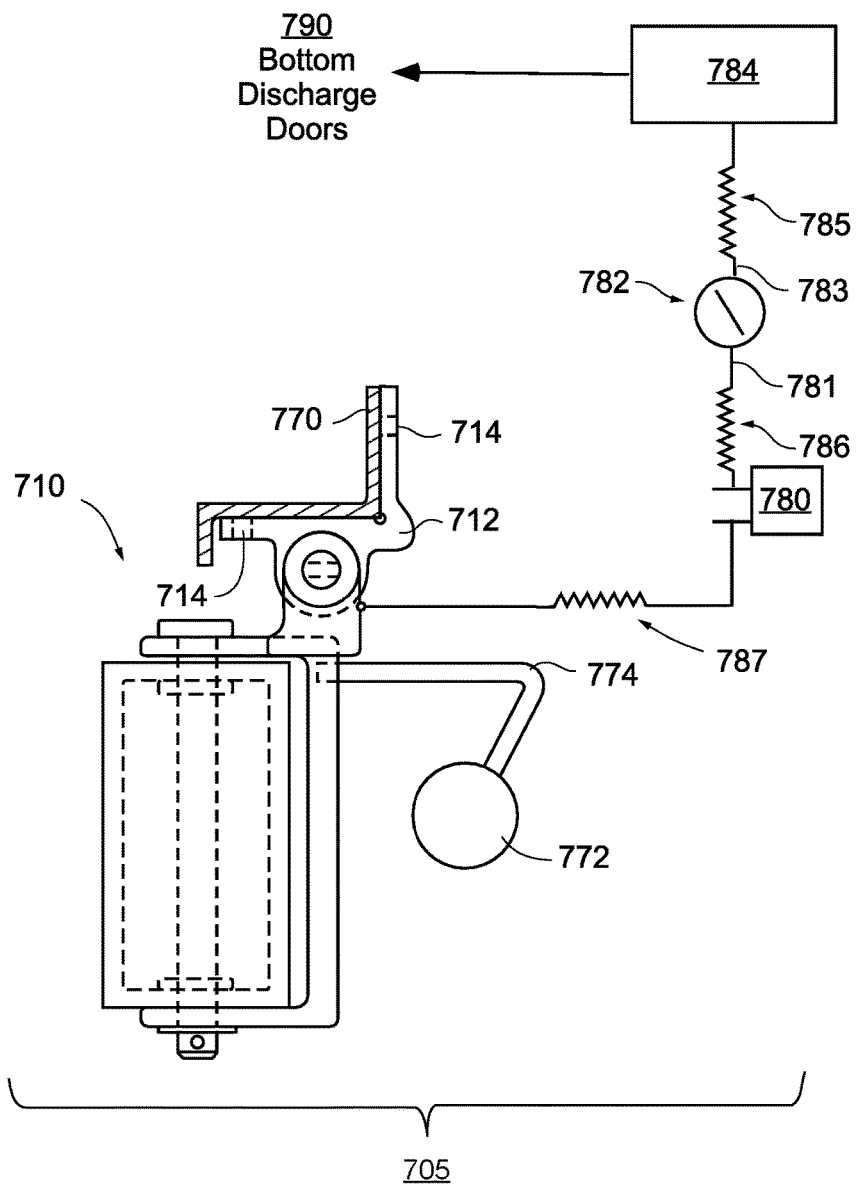
FIG. 7 is an elevation side view of a railroad hopper car door-actuating assembly mounted in position on a railcar, according to one embodiment of the invention.

FIG. 7 is an elevation side view 700 of a railroad hopper car door-actuating assembly 705 mounted in position on a railcar, according to one embodiment of the present invention. In this embodiment, door-actuating assembly 705 comprises a battery 780 electrically connected on one end to a pick-up shoe 710, and on the other end to a hermetically sealed switch 782. The hermetically seal switch 782 is in turn electrically connected to battery 780 at terminal 781, and to an electro-pneumatic valve 784 at terminal 783. Resistors 785, 786, 787, and similar electronic components such as diodes and circuit breakers (not shown) may be inserted in between pick-up shoe 710, battery 780, hermetically sealed switch 782, and electro-pneumatic valve 784, based on additional system and circuit design goals.

In some embodiments of the present invention, battery 780 may be rechargeable via pick-up shoe 710 when pick-up shoe 710 is biased into an active position having physical contact with an electrified wayside conductor rail. This recharging process may be performed outside a dump site, with the hermetically sealed switch 782 turned off and battery 780 grounded separately to complete the circuit. In some embodiments, rechargeable battery 780 may be an industrial strength capacitor that may be charged and discharged quickly to provide the desired electrical control signal. Exemplary capacitor designs include, but are not limited to, ceramic capacitors, electrolytic capacitors, tantalum capacitors, silver mica capacitors, polystyrene film capacitors, polyester film capacitors, metalized polyester film capacitors, polycarbonate capacitors, polypropylene capacitors, glass capacitors, and supercap capacitors. In some embodiments, rechargeable battery 780 may comprise one or more electrochemical cells. In some embodiments, rechargeable battery 780 may be of high durability, capable of being operated in extreme temperatures and wear conditions.

Once rechargeable battery 780 is charged beyond a predetermined state of charge to ensure a desired terminal voltage may be obtained once load is applied, pick-up shoe 710 may be biased again into an inactive position not having physical contact with the way side conductor rail, eliminating further occurrence of sparks. The state of charge (SOC) of a battery expresses a present battery capacity as a percentage of a maximum capacity; the terminal voltage is the voltage between the battery terminals with load applied, varying with SOC and discharge current. For example, the conductor rail may be designed with a length that ensure when the railroad hopper car moves along the track, the rechargeable battery may be charged to an SOC of 80%. One the railroad car enters the dump site with the pick-up shoe inactivated, hermetically sealed switch 782 may be turned on, automatically or manually, so that rechargeable battery 780 may send an electrical signal to electro-pneumatic valve 784 to open or close bottom discharge doors 790. By utilizing rechargeable battery 780 and hermetically sealed switch 782, the door-actuating process may be separately conducted from the operations of the pick-up shoe, thus eliminating the occurrence of sparks within a dump site.

In different embodiments of the present invention, a pick-up shoe as disclosed herein may be biased by a spring or a counter-weight. In particular, FIG. 7 shows a spring-less pick-up shoe 710 with a counterweight 772 attached through an arm 774. Pick-up shoe 710 is attached to an insulating bracket 712 which is rigidly affixed to a railroad car section 770 by a plurality of fasteners which extend through a plurality of openings 714.

Figure 8A:
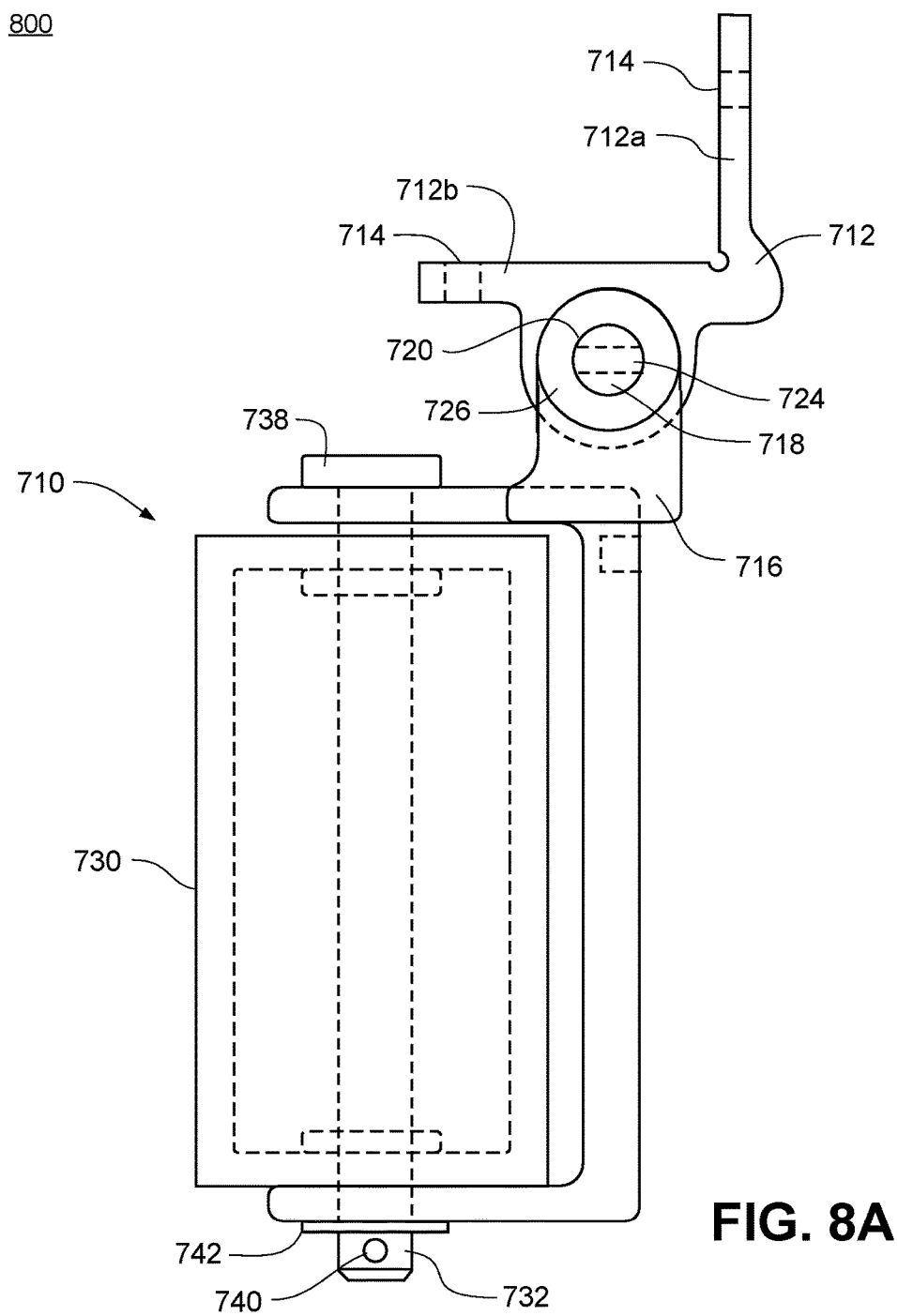
FIG. 8A is an elevation view of a railroad pick-up shoe, according to one embodiment of the invention.
Figure 8B:
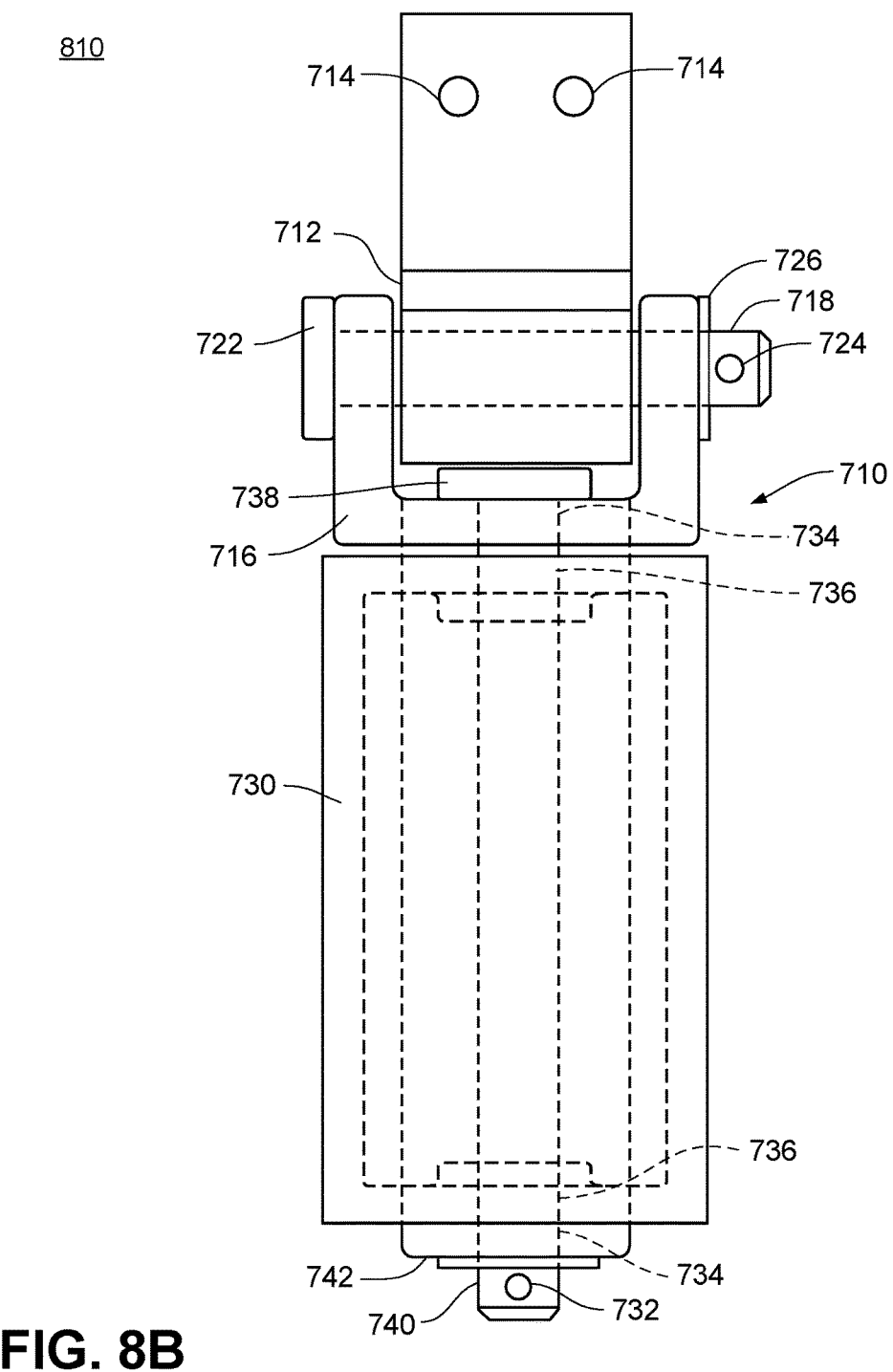
FIG. 8B is a front view of the pick-up shoe shown in FIG. 8A.
Figure 8C:
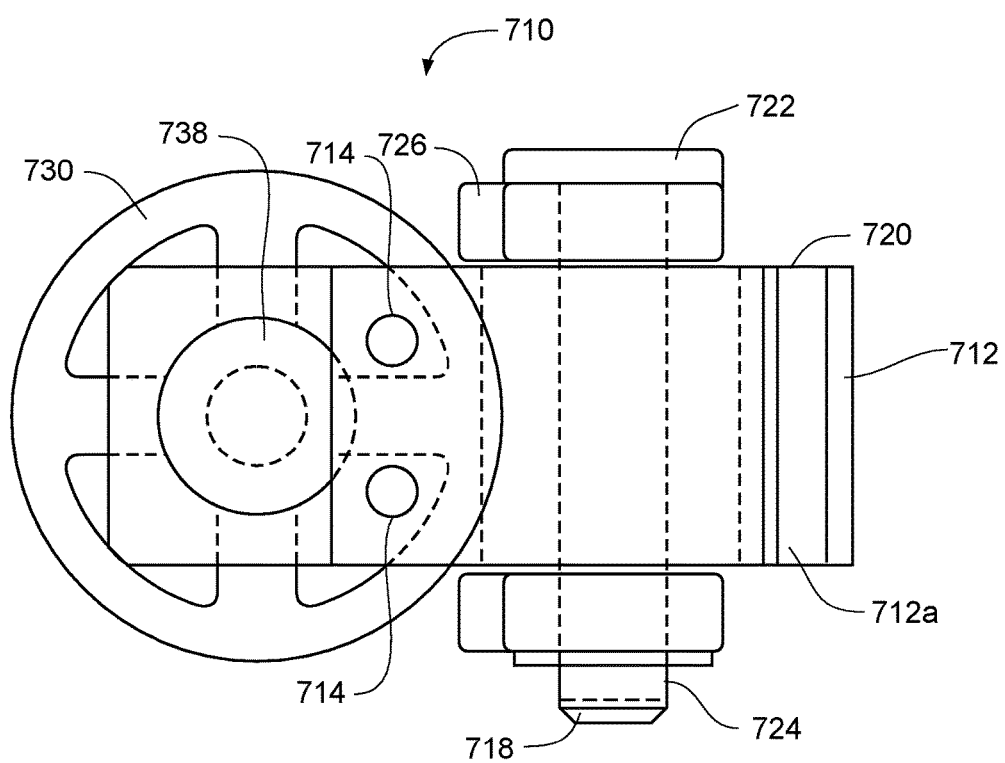
FIG. 8C is a top view of the pick-up shoe shown in FIG. 8A.

FIGS. 8A to 8C show an elevation view 800, a front view 810, and a top view 820 of the railroad pick-up shoe 710. Bracket 712, which consists of a first section 712a and a second section 712b perpendicular to section 712a, is coupled for rotation to a contact holder 716 by a pin 718 which passes through a pair of openings 720 within holder 716. Pin 718, which contains a head 722 and a through aperture 724, may be held in place by a washer 726 and a cotter pin (not shown) or the like inserted through aperture 724. Bracket 712 may be constructed from a non-conductive material such as plastic or another similar polymer to electrically isolate pick-up shoe 710 from the body of the railcar.

An electrical contact 730 may be rotatably fastened within contact holder 716. Contact 730, which constitutes a tubular electrode, may be positioned within holder 716 by a pin 732 such that contact 730 may rotate within holder 716 around pin 732, which passes through openings 734 within holder 716 and openings 736 within contact 730. Pin 732, which contains a head 738 and a through aperture 740, may be held in place by a washer 742 and a cotter pin (not shown) or the like inserted through aperture 740. Contact 730 may be manufactured from a conductive material and acts as a commutator switch between the trackside rail and the railcar itself.

Figure 9:
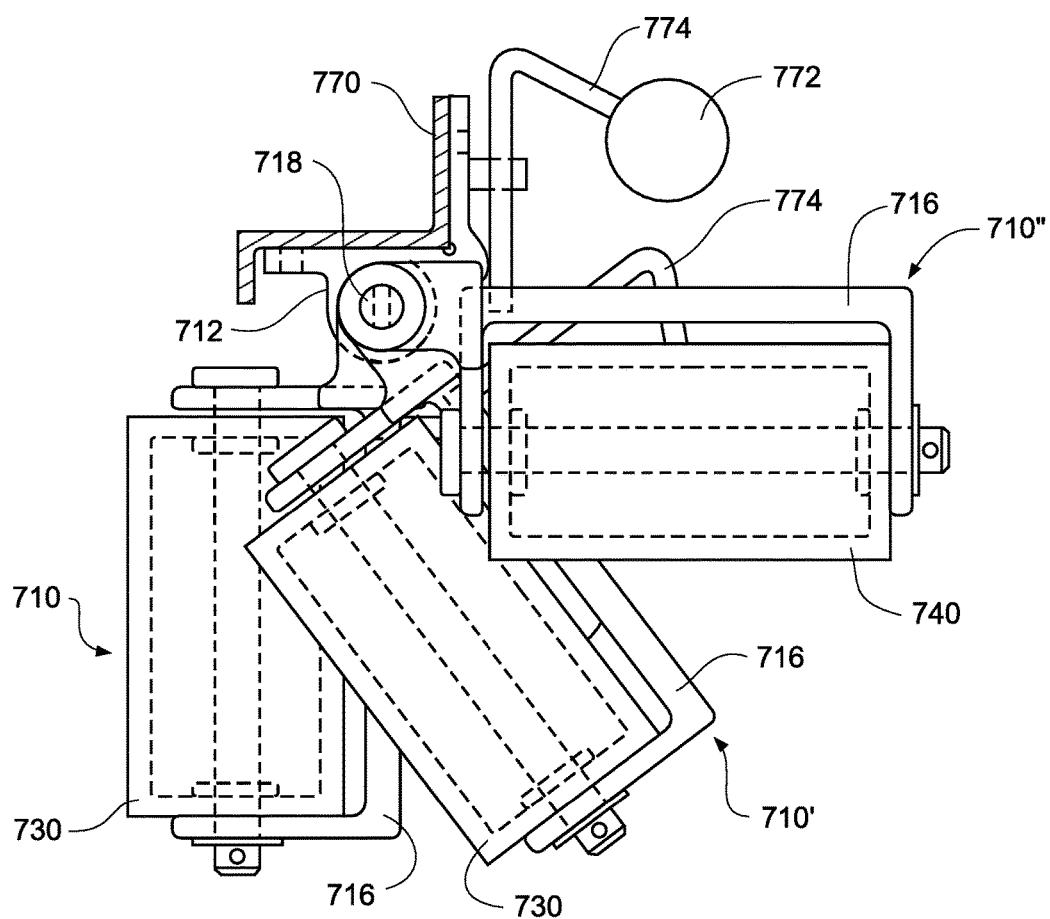
FIG. 9 is an elevation view of the pick-up shoe shown in FIG. 8A, mounted on a railroad car sitting on a railroad track, according to one embodiment of the invention.

FIG. 9 is an elevation view 900 of the pick-up shoe 710 shown in FIG. 8A, mounted on a railroad car sitting on a railroad track, according to one embodiment of the invention. In FIG. 9, a railroad car section 770 is shown in its operating position affixed to pick-up shoe 710 using fasteners which pass through openings 714 of bracket 712. Alternatively, item 770 may be a separate bracket which attaches directly to the railroad car. A counterweight 772 is attached to contact holder 716 by an arm 774. Counterweight 772 acts to hold contact 730 in constant rolling contact with the trackside rail while the car is in motion when it is desired to provide electrical power to the railroad car. Counterweight 772 may weight up to four pounds in some embodiments of the present invention.

More specifically, FIG. 9 shows the pick-up shoe 710 in three positions: the operating position (as shoe 710), the intermediate position (as shoe 710'), and its inactive position (as shoe 710"). When shoe 710" is in the inactive position, it is held in place by a latch, which holds arm 774. The pick-up shoe is fixed in the inactive position whenever it is not in use providing operating power or electrical signal to the railroad car. The intermediate position is shifted away from the wayside or trackside rail where the pick-up shoe is inoperative or inactive. In the operating position, shoe 710 has been pivoted about pin 718 in a counterclockwise direction. Note that as counterweight 772 is attached to the pick-up shoe, it tends to pull shoe 710' toward the rail, thus shoe 710' must be held in this position or it will move back into contact with the rail.

Figure 10:
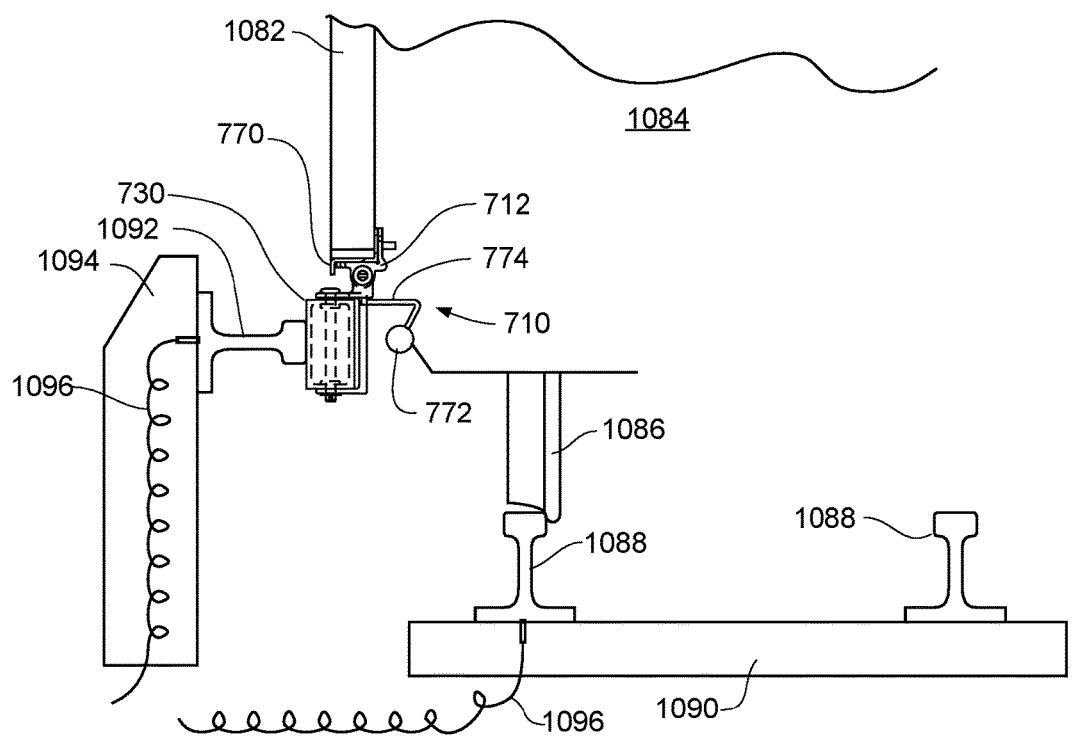
FIG. 10 is an elevation view of the pick-up shoe shown in FIG. 8A, mounted on a railroad car traveling along a railroad track, according to one embodiment of the invention.

FIG. 10 is an elevation view 1000 of the pick-up shoe 710 shown in FIGS. 8A-8C, mounted on a railroad car traveling along a railroad track, according to one embodiment of the invention. Here pick-up shoe 710 is in operation, providing operating power to a door-actuating assembly (not shown). In FIG. 10, pick-up shoe 710 is affixed to a side panel 1082 of a metal railroad car 1084 having a metal wheel 1086 which travels along one of a set of metal rails 1088 which are attached to a series of railroad ties 1090. A trackside third rail or wayside conductor rail 1092 is mounted on a support 1094 along the edge of rails 1088. A pair of conductors 1096 are connected to rail 1092 and also to rail 1088. As the railroad car moves along rails 1088, contact 730 of shoe 710 maintains rolling contact with rail 1092 which is electrified through conductor 1096. The current path is completed by virtue of car body 1084 and wheel 1086, which constantly contacts rails 1088, and conductor 1096. Shoe 710 may be electrically isolated from car 1084 as bracket 712 may be composed of anon-conductive material. Thus, electrical current is available on the railroad car to operate a valve in the like which may be used to operate a discharge mechanism for opening and closing the doors of the hoppers.

As contact 730 is in constant rolling contact with rail 1092 during operation, wear on the contact is greatly reduced as compared to an electrical contact in sliding contact with the rail, greatly increasing the operating life of the pick-up shoe. In addition, the use of counterweight 772 to ensure proper consistent contact for shoe 710 with rail 1092 provides a reliable way to provide power to the railroad car including the door actuating mechanisms without the use of openings, which will fatigue after a limited number of usages.

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every user is accommodated to practice the methods of the present invention.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A bottom discharge door, comprising:
   a first door plate comprising a first hinged end and a first distal end opposite to the first hinged end;
   a first seal member comprising a first attachment portion and a first seal lip,
      wherein the first seal member is fixedly connected to the first distal end at the first attachment portion,
      wherein the first seal lip protrudes from the first distal end, and
      wherein the first seal lip comprises a first obtuse angle on a lower surface of the first seal lip;

a second door plate comprising a second hinged end and a second distal end opposite to the second hinged end; and a second seal member comprising a second attachment portion and a second seal lip, wherein the second seal member is fixedly connected to the second distal end at the attachment portion, wherein the second seal lip protrudes from the second distal end, wherein the second seal lip comprises a second angle smaller than the first angle, on an upper surface of the second seal lip, wherein at least one of the first and second door plates is rotatable around its hinged end, between a closed position and an open position for the bottom discharge door, and wherein when the bottom discharge door is in the closed position, the first obtuse angle interlocks with the second angle to form a seal.

2. The bottom discharge door of claim 1, wherein the first obtuse angle is measured between 93 degrees inclusive and 95 degrees inclusive.

3. The bottom discharge door of claim 1, wherein the second angle is a right angle.

4. The bottom discharge door of claim 1,
wherein the first attachment portion is a flat plate,
wherein the first attachment portion and the first seal lip form a third angle on a lower surface of the first seal member, and
wherein the third angle is measured between 145 degrees inclusive and 150 degrees inclusive.

5. The bottom discharge door of claim 1,
wherein the second attachment portion is a flat plate, and
wherein the second attachment portion and the second seal lip form a right angle on a lower surface of the second seal member.

6. The bottom discharge door of claim 1,
wherein the first seal member is fixedly connected the first distal end at the first attachment portion through welding, bolting, or clamping, and
wherein the second seal member is fixedly connected to the second distal end at the second attachment portion through welding, bolting, or clamping.

7. The bottom discharge door of claim 1, wherein each of the first and second seal lips elastically deflects when the bottom discharge door is in the closed position.

8. The bottom discharge door of claim 1, wherein each arm of each of the first obtuse angle and the second angle measures at least 2 inches in length.

9. A railroad hopper car with bottom discharge doors having angled seals, comprising:
a body;
a plurality of hoppers along an underside of the body; and
a plurality of bottom discharge doors situated on the underside of body for opening and closing the plurality of hoppers, each bottom discharge door comprising:
a first door plate comprising a first hinged end and a first distal end opposite to the first hinged end;
a first seal member comprising a first attachment portion and a first seal lip,
wherein the first seal member is fixedly connected to the first distal end at the first attachment portion,
wherein the first seal lip protrudes from the first distal end, and
wherein the first seal lip comprises a first bent forming a first obtuse angle on a lower surface of the first seal lip;

a second door plate comprising a second hinged end and a second distal end opposite to the second hinged end; and a second seal member comprising a second attachment portion and a second seal lip, wherein the second seal member is fixedly connected to the second distal end at the attachment portion, wherein the second seal lip protrudes from the second distal end, wherein the second seal lip comprises a second bent forming a second angle smaller than the first obtuse angle, on an upper surface of the second seal lip, wherein at least one of the first and second door plates is rotatable around its hinged end, between a closed position and an open position for the bottom discharge door, and wherein when the bottom discharge door is in the closed position, the first obtuse angle interlocks with the second angle to form a seal between the first seal member and the second seal member.

10. The railroad hopper car of claim 9, wherein the first obtuse angle is measured between 93 degrees inclusive and 95 degrees inclusive.

11. The railroad hopper car of claim 9, further comprising a door-actuating assembly for actuating the bottom discharge doors, wherein the door-actuating assembly comprises:
a pick-up shoe;
a battery electrically connected to the pick-up shoe,
wherein the battery is rechargeable via the pick-up shoe when the pick-up shoe is biased into an active position having physical contact with a wayside conductor rail;
a hermetically sealed switch electrically connected to the battery at a first terminal; and
an electro-pneumatic valve electrically connected to the hermetically sealed switch at a second terminal, for actuating at least one bottom discharge door between the open position and the closed position, after the battery is charged beyond a pre-determined state of charge, and after the pick-up shoe is biased into an inactive position not having physical contact with the wayside conductor rail.

12. The railroad hopper car of claim 11, wherein the battery is a capacitor.

13. The railroad hopper car of claim 11, wherein the electro-pneumatic valve operates between 24 VDC and −24 VDC.

14. The railroad hopper car of claim 11, wherein the pick-up shoe is spring-biased.

15. The railroad hopper car of claim 11, wherein the pick-up shoe further comprises:
a base plate adapted to be attached to the railroad hopper car;
an electrical contact attached to the base plate; and
a counterweight for biasing the pick-up shoe into physical contact with the wayside conductor rail.

16. The railroad hopper car of claim 9, wherein the second angle is a right angle.

17. The railroad hopper car of claim 9,
wherein the first attachment portion is a flat plate,
wherein the first attachment portion and the first seal lip form a third angle on a lower surface of the first seal member, and
wherein the third angle is measured between 145 degrees inclusive and 150 degrees inclusive.

18. The railroad hopper car of claim 9,
wherein the second attachment portion is a flat plate, and
wherein the second attachment portion and the second seal lip form a right angle on a lower surface of the second seal member.

19. The railroad hopper car of claim 9,
wherein the first seal member is fixedly connected the first distal end at the first attachment portion through welding, bolting, or clamping, and
wherein the second seal member is fixedly connected to the second distal end at the second attachment portion through welding, bolting, or clamping.

20. The railroad hopper car of claim 9, wherein each of the first and second seal lips elastically deflects when the bottom discharge door is in the closed position.

\* \* \* \* \*